United States Patent [19]

Chung

[11] 4,188,351

[45] Feb. 12, 1980

[54] ELASTOMER BLEND COMPOSITION OF A SULFONATED EPDM TERPOLYMER AND A POLYSTYRENE RESIN

[75] Inventor: Chan I. Chung, Schenectady, N.Y.

[73] Assignee: Exxon Research & Engineering Co., Florham Park, N.J.

[21] Appl. No.: 950,419

[22] Filed: Oct. 11, 1978

Related U.S. Application Data

[62] Division of Ser. No. 791,162, Apr. 26, 1977.

[51] Int. Cl.² .............................................. C08L 23/16
[52] U.S. Cl. .................... 260/33.6 AQ; 260/33.6 PQ; 260/42.47; 525/198; 525/203
[58] Field of Search ........................ 260/897, 33.6 AQ

[56] References Cited

U.S. PATENT DOCUMENTS

| | | | |
|---|---|---|---|
| 3,642,728 | 2/1972 | Canter | 260/79.3 R |
| 3,974,240 | 8/1976 | Bock et al. | 260/897 B |
| 3,974,241 | 8/1976 | Lundberg et al. | 260/897 B |

*Primary Examiner*—Carman J. Seccuro
*Attorney, Agent, or Firm*—Richard E. Nanfeldt

[57] ABSTRACT

This invention relates to heterogeneous elastomeric blends having improved rheological properties of a major portion of a neutralized sulfonated elastomeric polymer with a minor portion of a polystyrene thermoplastic resin or a neutralized sulfonated polystyrene resin and mixtures thereof. Both the sulfonated elastomeric polymer and the sulfonated thermoplastic resin have about 0.2 to about 10.0 mole percent of $SO_3H$ groups, at least 90% of which are neutralized with an organic amine.

16 Claims, 13 Drawing Figures

ELASTOMER BLEND COMPOSITION OF A SULFONATED EPDM TERPOLYMER AND A POLYSTYRENE RESIN

This is a division, of application Ser. No. 791,162, filed Apr. 26, 1977.

FIELD OF THE INVENTION

This invention relates to heterogeneous elastomeric blends having improved rheological properties of a major portion of a neutralized sulfonated elastomeric polymer with a minor portion of a polystyrene thermoplastic resin or a neutralized sulfonated polystyrene resin and mixtures thereof. Both the sulfonated elastomeric polymer and the sulfonated thermoplastic resin have about 0.2 to about 10.0 mole percent of $SO_3H$ groups, at least 90% of which are neutralized with an organic amine.

BACKGROUND OF THE PRIOR ART

U.S. Pat. No. 3,642,728, herein incorporated by reference, teaches a new class of sulfonated polymers which are derived from polymers containing olefinic unsaturation, especially elastomeric polymers, e.g. butyl and ethylenepropylene terpolymers. These materials may be neutralized with organic amines or basic materials selected from Groups I, II, III, IV, V, VI-B, VII-B and VIII and mixtures thereof of the Periodic Table of Elements. These materials, especially the butyl and the ethylene-propylene terpolymer (EPDM) derivatives, may broadly be classified as thermoelastomers, that is these materials may be processed at high temperatures by use of shear force in the presence of selected polar additives and yet at the temperature of use, e.g. room temperature, the materials, through the association of the sulfonate group behave as cross-linked elastomers. Thus, these materials represent one form of reprocessable elastomers, which are very desirable in industry.

However, although these materials are commercially useful, the melt viscosity even at very high temperature tends to be sufficiently high as to preclude the use of conventional plastic fabrication techniques. Thus, the very purpose for which these compounds are derived is not adequately fulfilled. In this invention, it has unexpectedly been discovered that decreased melt viscosity may be obtained by combining these polymers with a minor portion of a polystyrene thermoplastic resin or a sulfonated polystyrene in a heterogeneous polymer blend. Further, it has been unexpectedly discovered that the tensile properties of these blends, as measured at room temperature, can be substantially improved as compared to the sulfonated elastomers alone.

The sulfonated elastomers described in U.S. Pat. No. 3,647,728, herein incorporated by reference, when used as gums possess a relatively low level of rigidity or stiffness which yields rather limp materials incapable of supporting themselves when prepared in thin sections. This is a major limitation, if one desires to prepare dimensionally stable parts, e.g. automotive or appliance applications. It is known in the art that stiffness of elastomers may be increased by the combination of carbon black or inorganic material such as clays, calcium carbonate or silicates, etc. However, these materials, while increasing the hardness, further deteriorate the melt viscosity of the above-described ionic elastomers. Thus, systems which at best have borderline processability even at very low metal sulfonate levels further deteriorate in their flow behavior and thus cannot be processed at all. It has unexpectedly been discovered that in the compositions of the instant invention, wherein minor amounts of the unsulfonated or sulfonated polystyrene are combined with the sulfonated elastomers described above, result in increased tensile modulus at room temperature.

Thus, this invention teaches compositions of matter which represent significant improvement over the prior art in that low melt viscosity is obtained at no loss in tensile properties.

The present application is related to two other filed applications Ser. Nos. 514,502, now U.S. Pat. No. 3,905,586 and 514,512, now U.S. Pat. No. 3,923,370, herein incorporated by reference. These two applications, which have issued, are related to elastomeric blends of a crystalline polyolefinic resin and a neutralized sulfonated elastomeric blends. These blends are of a homogeneous nature, wherein the crystalline polyolefinic resin appears completely soluble in the sulfonated elastomeric polymer at elevated temperatures. The melt rheology and tensile properties of these homogeneous blends are improved as compared to the unmodified sulfonated elastomeric polymer due to the plasticization of the polymeric backbone of the elastomeric polymer. However, the blending of an inorganic filler with neutralized sulfonated elastomeric polymer creates a heterogeneous blend, wherein the rheological and physical properties are adversely affected due to incomplete interfacial bonding between the inorganic particles and the elastomeric matrix. Blends of a neutralized sulfonated elastomeric polymer and a polystyrene thermoplastic resin or a sulfonated polystyrene thermoplastic resin, wherein the thermoplastic resin is at a concentration level in excess of 20 parts per hundred by weight based on 100 parts of the neutralized sulfonated elastomeric polymer, exhibit a general deterioration in physical properties due to the manifestation of gross incompatibility. Surprisingly, it has been found that the incorporation of the polystyrene or sulfonated polystyrene at a concentration level of below about 20 parts per hundred by weight results in compositions exhibiting both improved physical and rheological properties.

SUMMARY OF THE INVENTION

It has been unexpectedly discovered that novel elastomeric heterogeneous blend compositions comprising a major portion of a sulfonated elastomeric polymer having at least 90% of the $SO_3H$ groups combined with an organic amine and a minor portion of a polystyrene thermoplastic resin or a neutralized sulfonated polystyrene and mixtures thereof show unexpectedly improved melt viscosity properties and improved room temperature physical properties (as compared to the sulfonated elastomer) itself. More particularly, the sulfonated elastomer is derived from an EPDM terpolymer (i.e., a terpolymer of ethylene, propylene, and a small amount, e.g., <10 mole % of a diene monomer).

Accordingly, it is an object of my present invention to provide elastomeric heterogeneous blend compositions of a neutralized sulfonated elastomeric polymer and a polystyrene thermoplastic resin or a sulfonated polystyrene, wherein these heterogeneous blend compositions have both improved physical and rheological properties as compared to the unmodified neutralized sulfonated elastomeric polymer.

A further object of my present invention is to provide a unique and novel process for the formation of these elastomeric heterogeneous blend compositions having improved physical and rheological properties.

GENERAL DESCRIPTION OF THE INVENTION

This present invention relates to unique and novel heterogeneous blend compositions of a neutralized sulfonated elastomeric polymer and a polystyrene thermoplastic resin or a sulfonated polystyrene, wherein the polystyrene is microdispersed as discrete particles in the neutralized sulfonated elastomeric polymer matrix. These heterogeneous blend compositions exhibit improved physical and rheological properties thereby permitting these heterogeneous blend compositions to be processed by conventional plastic fabricating techniques such as injection molding or extrusion.

Various chemical additives can be incorporated into the heterogeneous blend compositions for modification of a particular physical property.

The EPDM terpolymers are low unsaturated polymers having about 0.1 to about 10 mole % olefinic unsaturation defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 are French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably the polymer contains about 50 to about 60 wt. % ethylene, e.g. 50 wt. % and about 2.6 to about 9.0 wt. % diene monomer, e.g. 5.0 wt. %. The diene monomer is preferably a nonconjugated diene.

Illustrative of these nonconjugated diene monomers which may be used in the terpolymer (EPDM) are 1,4 hexadiene, dicyclopentadiene, ethylidene norbornene, methylene norbornene, propenyl norbornene, and methyl tetrahydroindene. The EPDM terpolymer has a number average molecular weight of about 10,000 to about 200,000, more preferably of about 15,000 to about 100,000, most preferably of about 20,000 to about 60,000. The Mooney viscosity of the EPDM terpolymer at (1+8) min. at 212° F. is about 5 to about 90, more preferably about 10 to about 50, most preferably about 15 to about 25. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

A typical EPDM terpolymer is Vistalon 3708 (Exxon Chemical Co.). Vistalon 3708 is a terpolymer having a Mooney viscosity at (1+8) min. at 212° F. of about 45-55 and having about 64 wt. % ethylene, about 3.3 wt. % of 5-ethylidene-2-norbornene, and having about 53 wt. % of ethylene, about 3.5 wt. % of 1,4 hexadiene, and about 43.5 wt. % of propylene.

The polystyrene thermoplastic resins of the present invention are selected from the group consisting essentially of polystyrene, poly-t-butyl-styrene, polychlorostyrene, polyalpha methyl styrene or co- or terpolymers of the aforementioned with acrylonitrile or vinyl toluene.

The polystyrene thermoplastics suitable for use in the practice of the invention have a glass transition temperature from about 90° C. to about 150° C., more preferably about 90° C. to about 140° C. and most preferably about 90° C. to about 120° C. These polystyrene resins have a weight average molecular weight of about 5,000 to about 500,000, more preferably about 20,000 to about 350,000 and most preferably about 90,000 to about 300,000. These base polystyrene thermoplastic resins can be prepared directly by any of the known polymerization processes. The term "thermoplastic" is used in its conventional sense to mean a substantially rigid (flexus modulus > 10,000 psi) material capable of retaining the ability to flow at elevated temperatures for relatively long times.

The preferred polystyrene thermoplastic resin is a homopolymer of styrene having a number average molecular weight of about 180,000, and an intrinsic viscosity in toluene of about 0.8. These polymers are widely available commercially in large volume. A suitable material is Dow Polystyrene 666 which affords a suitable molecular weight.

In carrying out the invention, the EPDM terpolymer or the polystyrene thermoplastic resin is dissolved in a nonreactive solvent such as chlorinated aromatic hydrocarbon, a chlorinated aliphatic hydrocarbon, an aromatic hydrocarbon, of an aliphatic hydrocarbon such as chlorobenzene, benzene, toluene, xylene, cyclohexane, pentane, hexane, or heptane. The preferred solvents is carbon tetrachloride for both the EPDM terpolymer and the polystyrene thermoplastic resin. A sulfonating agent is added to the solution of the EPDM terpolymer and nonreactive solvent at a temperature of about −100° C. to about 100° for a period of time of about 5 to about 60 minutes, more preferably at room temperature for 45 minutes, and most preferably at room temperature for 30 minutes. Typical sulfonating agents are described in U.S. Pat. Nos. 3,642,728 and 3,836,511, incorporated herein by reference. These sulfonating agents are selected from an acyl sulfate, a mixture of sulfuric acid and an acid anhydride of a complex of a sulfur trioxide donor and a Lewis base containing oxygen, nitrogen, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, phosphorous acid, phosphonic acid, triethylphosphate, trimethylamine, or piperidine. The most preferred sulfonation agent for the polystyrene thermoplastic is an acyl sulfate selected from the group consisting essentially of benzoyl, acetyl, propionyl or butyryl acetate. The acyl sulfate can be formed in situ in the reaction medium or pregenerated before its addition to the reaction medium. A preferred acyl sulfate is acetyl sulfate. The most preferred sulfonation agent for the EPDM terpolymer is a complex of sulfur trioxide and dioxane. It should be pointed out that neither the sulfonating agent nor the manner of sulfonation is critical, provided that the sulfonating method does not degrade the polymeric backbone. The reaction is quenched with an aliphatic alcohol being selected from methanol, ethanol, n-propanol or isopropanol, with an aromatic phenol, or with water. The acid form of the sulfonated EPDM terpolymer a polystyrene thermoplastic resin has about 10 to about 100 meq. of $SO_3H$ groups per 100 grams of polymer, more preferably about 15 to about 40; and most preferably about 20 to about 35. The mole percent of $SO_3H$ groups is about 0.2 to about 20, more preferably about 0.2 to about 10.0. The meq. of $SO_3H$/100 grams of polymer was determined by both titration of the polymeric sulfonic acid and Dietert Sulfur analysis. In the titration of the sulfonic acid the polymer was dissolved in a solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The solution of the acid form of the sulfonated EPDM terpolymer and the sulfonated polystyrene thermoplastic resin are mixed together and neutralized with a neutralizing agent. Neutralization of the acid forms of the sulfonated EPDM terpolymer and the sulfonated polystyrene thermoplastic resin is done by the addition of an organic amine to form an amine salt.

The organic amines used to form the ionic bonds can be primary, secondary, or tertiary amines, wherein the organic radicals are $C_1$ to $C_{30}$ alkyl, phenyl, aralkyl or alkaryl. More preferably, the organic radical is a phenyl, $C_1$ to $C_{10}$ alkyl, $C_7$ to $C_{10}$ alkylaryl or $C_7$ to $C_{10}$ aralkyl. Illustrative of such amines are anhydrous piperazine, triethylamine, tri-n-propylamine and tetraethylene-pentamine, piperazine and tri-n-propylamine.

Guanidines are preferred neutralizing agents for the sulfonic acid groups to produce ionic sites. The preferred guanidines are guanidine or substituted guanidines, wherein the substituent organic radicals are $C_1$ to $C_{30}$ alkyl, phenyl, aralkyl, or alkaryl. Illustrative of such guanidines are tetra-methyl guanidine, di-phenyl guanidine and di-ortho-tolyl guanidine.

The preferred neutralizing agent for the acid forms of the sulfonated EPDM terpolymer and sulfonated polystyrene thermoplastic resin is di-ortho-tolyl guanidine (DOTG). Sufficient meq. of the metal salt of the carboxylic acid or the organic amine or added to the solution of the acid forms of the sulfonated EPDM terpolymer and the sulfonated polystyrene thermoplastic to effect at least about 1 to about 100% neutralization of the acid groups, more preferably about 50 to about 100%, and most preferably about 90 to about 100%.

The mixture of the neutralized sulfonated EPDM terpolymer and the neutralized sulfonated polystyrene thermoplastic resin is isolated from solution by steam stripping to give a heterogeneous blend of the neutralized sulfonated polystyrene microdispersed in the neutralized sulfonated elastomeric polymer.

Alternatively, a polystyrene dissolved in the carbon tetrachloride resin can be added to the solution of the acid form of the sulfonated elastomeric polymer. The DOTG is added to the solution to neutralize the acid form of sulfonated elastomeric polymer. The mixture of the polystyrene thermoplastic resin and the neutralized sulfonated elastomeric polymer are isolated from solution by steam stripping to give a heterogeneous blend of the polystyrene thermoplastic resin microdispersed in the neutralized sulfonated elastomeric polymer.

In order to maximize the compatability of the polystyrene or sulfonated polystyrene into the neutralized sulfonated elastomeric polymer, it is necessary to employ a solution process. Intensive mixing process such as a Banbury extruder or a two-roll mill results in compositions, wherein the physical and rheological properties have not been maximized.

The polystyrene thermoplastic resin or the sulfonated polystyrene is a minor proportion of the heterogeneous blend at a concentration level of about 1 to about 20 parts per hundred based on 100 parts of the neutralized sulfonated elastomeric polymer, more preferably about 2 to about 15; and most preferably about 3 to about 10.

Various chemical additives can be incorporated in the blend such as fillers and oils. These chemical additives are incorporated into the heterogeneous elastomeric blend by a conventional dry blend two-roll mill technique, or by a conventional intensive mixing process such as a high steam batch Banbury or a continuous twin screw extruder. The concentration level of these additives is from about 25 to about 300 parts per hundred based on 100 parts of the neutralized sulfonated elastomeric polymer, more preferably about 30 to about 250; and most preferably about 50 to about 200.

The fillers employed in the present invention are selected from carbon blacks, talcs, ground calcium carbonate, water precipitated calcium carbonate, or delaminated, calcined or hydrated clays and mixtures thereof. Examples of carbon black are oxides, acetylinics, lamp, furnace or channel blacks. Typically these fillers have a particle size of about 0.03 to about 15 microns, more preferably about 0.5 to about 10, and most preferably about 2 to about 10. The oil absorption of the filler as measured by grams of oil absorbed by 100 grams of filler is about 10 to about 70, more preferably about 10 to about 50 and most preferably about 10 to about 30. Typical fillers employed in this invention are illustrated in Table 1.

The oils employed in the present invention are nonpolar backbone process oils having less than about 3.5 wt. % polar type compounds as measured by molecular clay gel analysis. These oils are selected from paraffinics ASTM Type 104B as defined in ASTM-D-2226-70, aromatic ASTM Type 102 or naphthenics ASTM 104A, wherein the oil has a flash point by the Cleveland open cup of at least 350° F.; a pour point of less than 40° F., a viscosity of about 70 to about 3000 s.s.u.'s and a number average molecular weight of about 300 to about 1000, more preferably about 400 to about 75°. The preferred oils are napthenics. Table II illustrates typical oils encompassed by the scope of this invention.

TABLE 1

| Filler | Code # | Oil Absorption grams of oil/100 grams of filler | Specific Gravity | Avg. Particle Size Micron | pH |
|---|---|---|---|---|---|
| calcium carbonate ground | | 15 | 2.71 | | 9.3 |
| calcium carbonate precipitated | | 35 | 2.65 | .03–.04 | 9.3 |
| delaminated clay | | 30 | 2.61 | 4.5 | 6.5–7.5 |
| hydrated clay | | | 2.6 | 2 | 4.0 |
| calcined clay | | 50–55 | 2.63 | 1 | 5.0–6.0 |
| magnesium silicate (talc) | | 60–70 | 2.75 | 2 | 9.0–9.5 |

TABLE II

| Type Oil | Oil Code # | Viscosity ssu 100° F. | Mn | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |

TABLE II-continued

| Type Oil | Oil Code # | Viscosity ssu 100° F. | Mn | % Polars | % Aromatic | % Saturates |
|---|---|---|---|---|---|---|
| Aromatic | Flexon 340 | 120 | — | 1.3 | 70.3 | 28.4 |
| Naphthenic | Flexon 765 | 506 | — | 0.9 | 20.8 | 78.3 |
| Naphthenic | Flexon 580 | 1855 | — | 3.3 | 47.0 | 49.7 |

Alternatively, the oils can be incorporated in the elastomeric heterogeneous blend by the addition of the oil under agitation to the solution of the mixture of the neutralized sulfonated elastomeric polymer and the polystyrene or sulfonated polystyrene prior to the steam stripping step.

Compression molded pads were made of the heterogeneous blends at 350° F. for 5 min. wherein the sample pads were 2"×2"×0.040". Micro specimens were cut out from the pads for tensile, hardness, compression set, and stress relaxation measurements.

Tensile measurements were made by an Instron Tester at the crosshead speed of 2 in./min. using micro-dumbbell specimens. Melt rheological properties were measured by an Instron Capillary Rheometer with a 0.050"D×1", L, 90° entrance angle capillary.

The application for the heterogeneous blends of this invention are diverse. The blends have excellent injection molding and extrusion properties. For example, injection molded shoe soles may be prepared from the instant blends because of their excellent abrasion resistance and flex fatigue properties which are highly desired in such application. Injection molded parts for automotive applications may be prepared from the blends of this invention, e.g., automobile sight shields, flexible bumpers, grill parts, etc. It is readily apparent to those skilled in the art that the properties, such as rigidity, can be varied widely depending on the level of the polystyrene or sulfonated polystyrene incorporated in the sulfonated elastomeric polymer, thus fabrication of rigid or semiflexible articles from the instant blends is contemplated. Articles from the blends of the instant invention may also be prepared by extrusion techniques. For example, garden hose, having outstanding strength in combination with light weight is one application. The electrical properties of these materials also allow the use of the instant blends as insulation for wire. Insulation prepared from rubber or polyethylene often requires a curing or vulcanization step to obtain optimum properties. The blends of this invention have excellent physical properties, and excellent electrical properties without the need for any curing step. The fact that chemical curing is not required permits a relatively high speed extrusion operation which are not feasible with those systems requiring a curing step.

Other fabrication processes for these materials include vacuum forming, flow molding, slit extrusion, profile extrusion and similar operations. The wide versatility, from a fabrication viewpoint, permits the use of these blends in film, containers such as bottles, oriented sheet, fibers, especially oriented monofilament, packaging, appliance housing, floor mats, carpet backing, toys, sporting goods such as swim fins, face masks, and similar applications.

BRIEF DESCRIPTION OF THE DRAWINGS

The objects and features of the invention may be understood with reference to the following detailed description of an illustrative embodiment of the invention taken together with the accompanying drawings in which.

DETAILED DESCRIPTION OF THE PREFERRED EMBODIMENT

Figure 1:
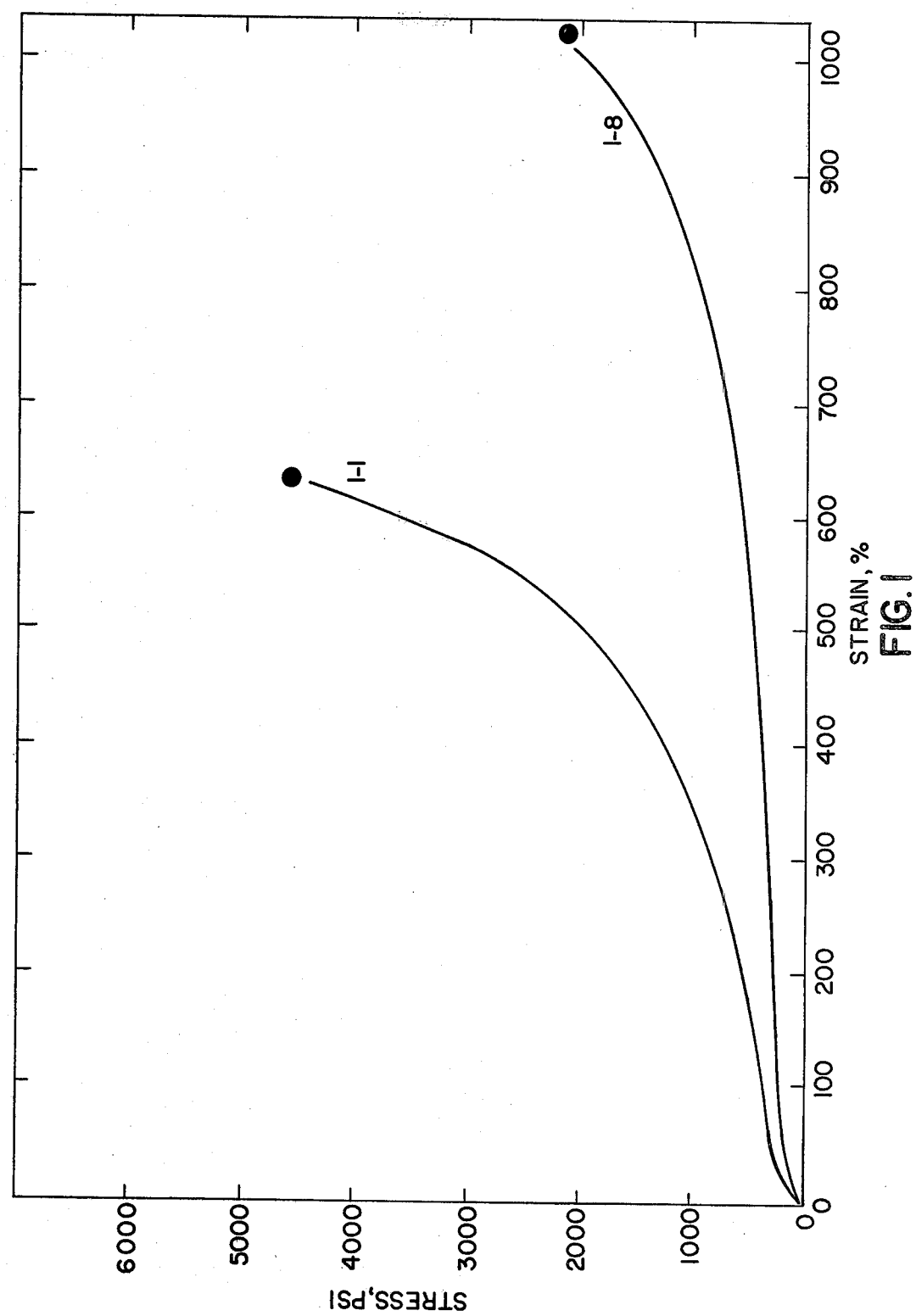
FIG. 1 illustrates a graph of gum tensile properties at room temperature and the effect of sulfonation on an EPDM terpolymer.

The advantages of the unique and novel elastomeric heterogeneous blend compositions and the unique and novel process for the formation of these compositions can be more readily appreciated by reference to the following examples, tables, and figures.

EXAMPLE I

PREPARATION OF AN ACID FORM OF A SULFONATED EPDM TERPOLYMER

To a solution of 90 grams of EPDM terpolymer (Vistalon 3708-Exxon Chemical Co.) in 3 liters of carbon tetrachloride at 50° C. was added a solution of a sulfonating agent which was formed at 10° from 141 ml. of methylene chloride, 2.4 ml. of sulfur trioxide, and 5 ml. of dioxane. Sulfonation was terminated after 30 min. by quenching with methanol. The acid form of the sulfonated EPDM terpolymer had 0.8 mole percent of $SO_3H$ groups/100 grams of terpolymer.

EXAMPLE II

PREPARATION OF AN ACID FORM OF A SULFONATED POLYSTYRENE RESIN

To a solution 20.8 grams of a polystyrene resin having an $\overline{M}w$ of $287 \times 10^3$ (Styron 666) in 100 ml. of carbon tetrachloride at 50° C. was added a solution of a sulfonating agent which was formed at 10° C. from 4.762 ml.

of ethylene dichloride, 0.905 ml. of anhydrous acetic anhydride and 0.333 ml. of 96.5% concentrated sulfuric acid and sulfonation was terminated after 60 min. by quenching with methanol. The acid form of the sulfonated polystyrene resin had 3.0 mole percent of $SO_3H$ groups/grams of polystyrene resin. Sulfonated polystyrene resins having an $\overline{M}w$ of $93 \times 10^3$ were also prepared, wherein the mole percent of $SO_3H$ was 3.0 or 6.0.

EXAMPLE III

PREPARATION OF ELASTOMERIC BLEND COMPOSITIONS

To the quenched solution of the sulfonated EPDM terpolymer, prepared according to Example I, was added a solution of polystyrene resin dissolved in carbon tetrachloride having an $\overline{M}w$ of $93 \times 10^3$ or $287 \times 10^3$. The resultant blended solution was neutralized at room temperature for 30 min. with di-ortho-tolyl guanidine (DOTG). The elastomeric blend compositions were recovered from solution by steam stripping.

Alternatively, to the quenched solution of the sulfonated EPDM terpolymer prepared according to Example I was added the solutions of Example II of the acid form of the sulfonated polystyrene resin having an $\overline{M}w$ of $287 \times 10^3$ or $93 \times 10^3$. The resultant blended solution was neutralized at room temperature for 30 minutes with di-ortho-tolyl guanidine. The elastomeric blend compositions were isolated from solution by steam stripping.

The elastomeric blend compositions were compounded on a hot micro-rubber mill. Sample pads of $2'' \times 2'' \times 0.040''$ were molded at 35° F. for 5 min. Microspecimens were cut out from the pads for tensile hardness, compression set and stress relaxation measurements.

Table III illustrates the formulas for these blend compositions and their physical properties as compared to an unsulfonated EPDM 3708 terpolymer, a sulfonated EPDM 3708 terpolymer, and Kraton 101.

nation and neutralization. The addition of 10 percent of polystyrene having an $\overline{M}w$ of $287 \times 10^3$ or sulfonated polystyrene having an $\overline{M}w$ of $287 \times 10^3$ does not change the hardness. However, the addition of either 10% of sulfonated or unsulfonated polystyrene having an $\overline{M}w$ of $93 \times 10^3$ increases the hardness. Increasing the wt. % of the sulfonated or unsulfonated polystyrene increases slightly the hardness. The addition of the sulfonated or unsulfonated polystyrene has little effect on the compression set, wherein the compositions with sulfonated polystyrene has somewhat lower compression set than samples from unsulfonated polystyrene.

Figure 3:
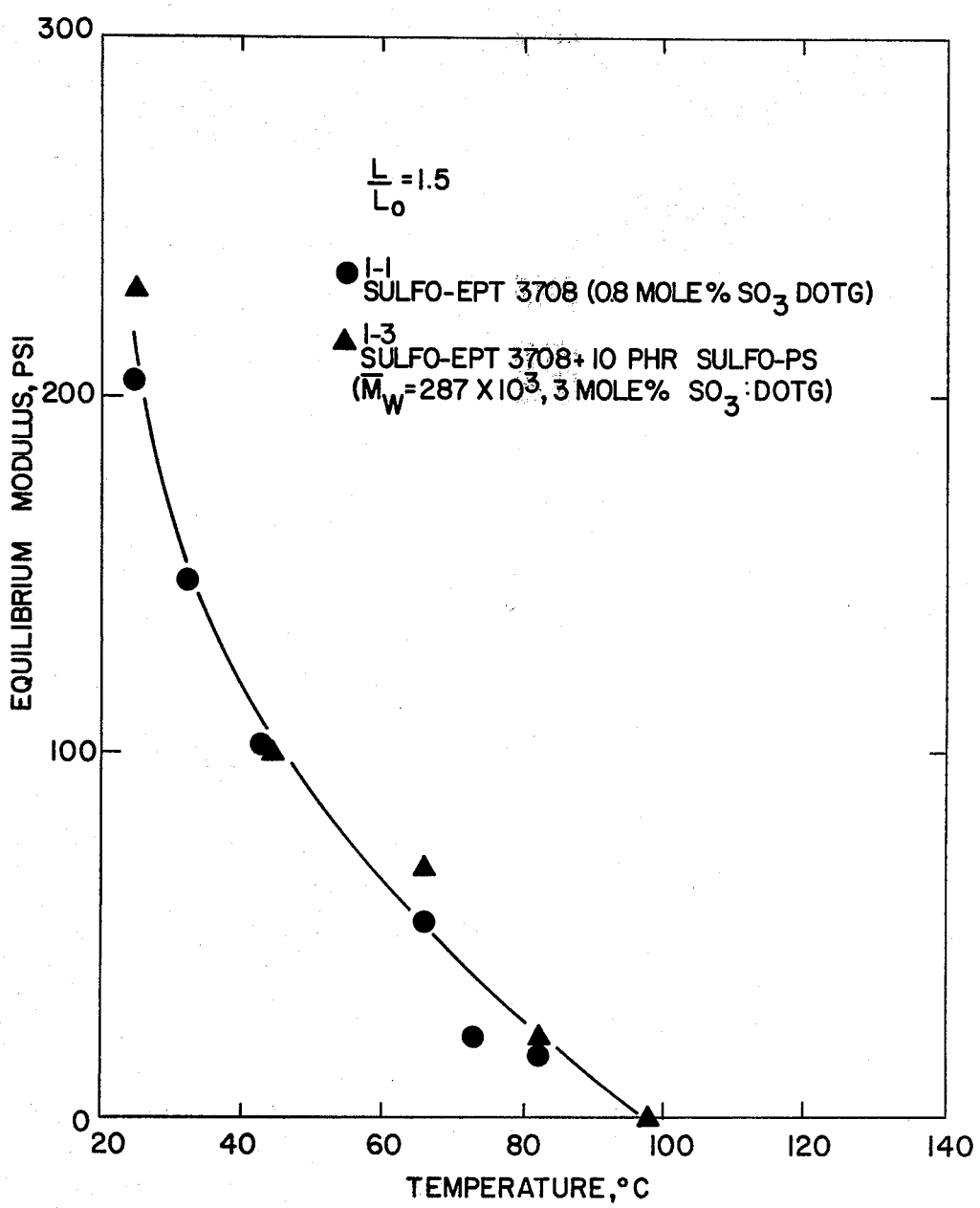
FIG. 3 illustrates a graph of stress relaxation as a function of temperature.

FIG. 3 shows the effect of the sulfonated polystyrene on the equilibrium stress relaxation modulus of sulfonated EPDM 3708 as a function of temperature. Ten percent of sulfonated polystyrene has no effect on the equilibrium stress relaxation modulus of the sulfonated EPDM 3708.

Figure 4:
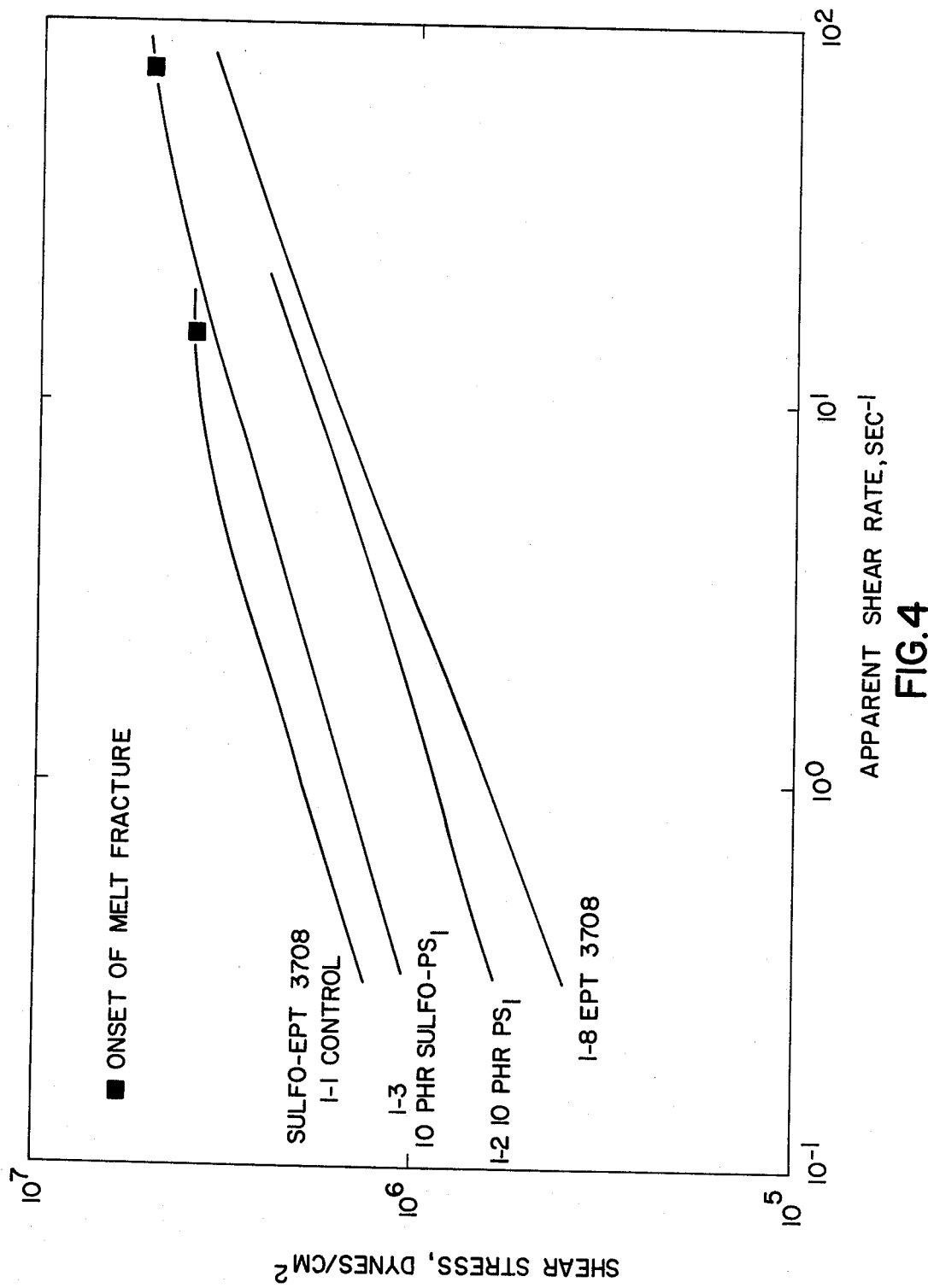
FIGS. 4 and 5 illustrates a graph of the rheological properties of a sulfo-EPDM at 200° C.
Figure 5:
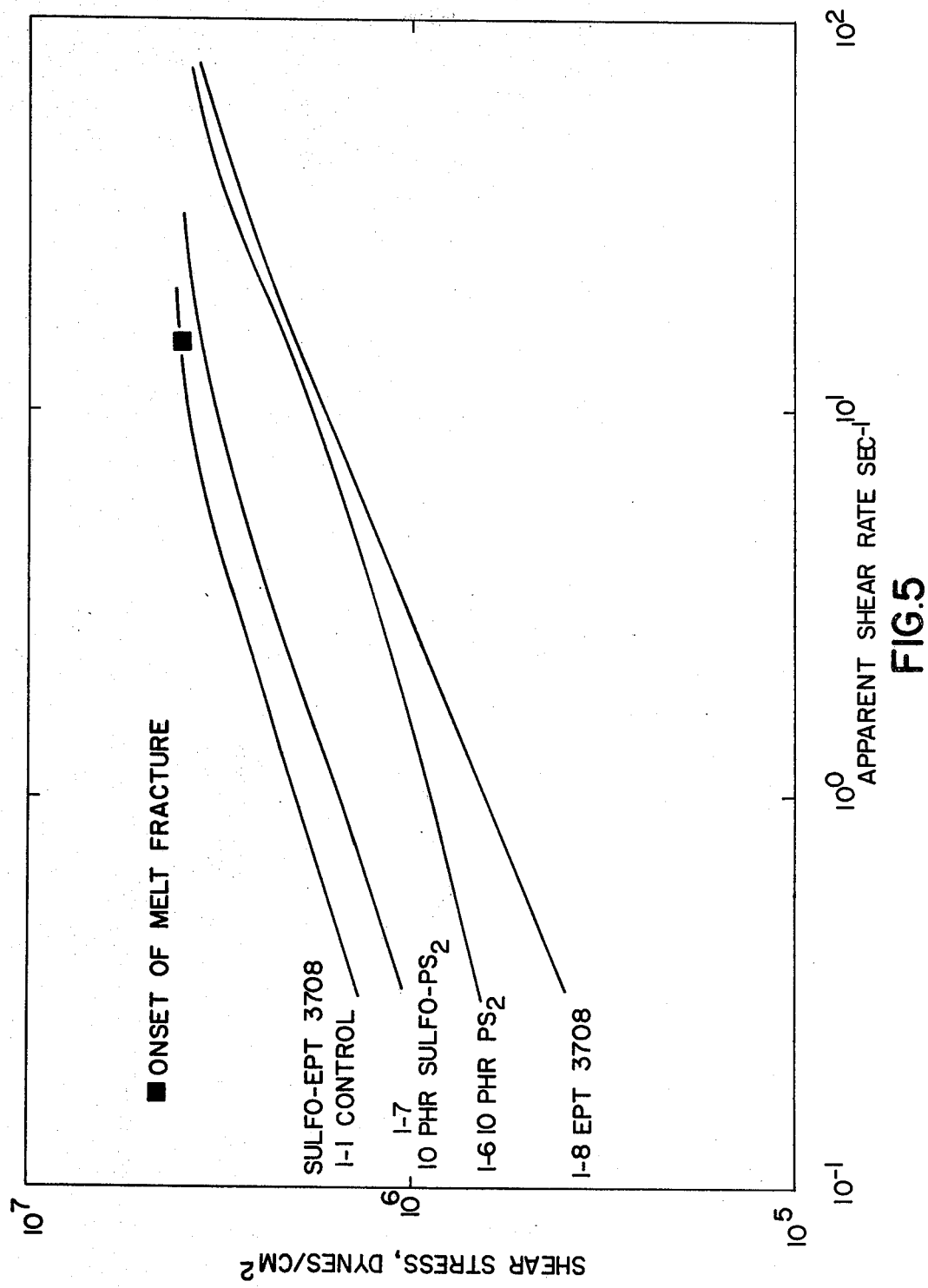
Figure 6:
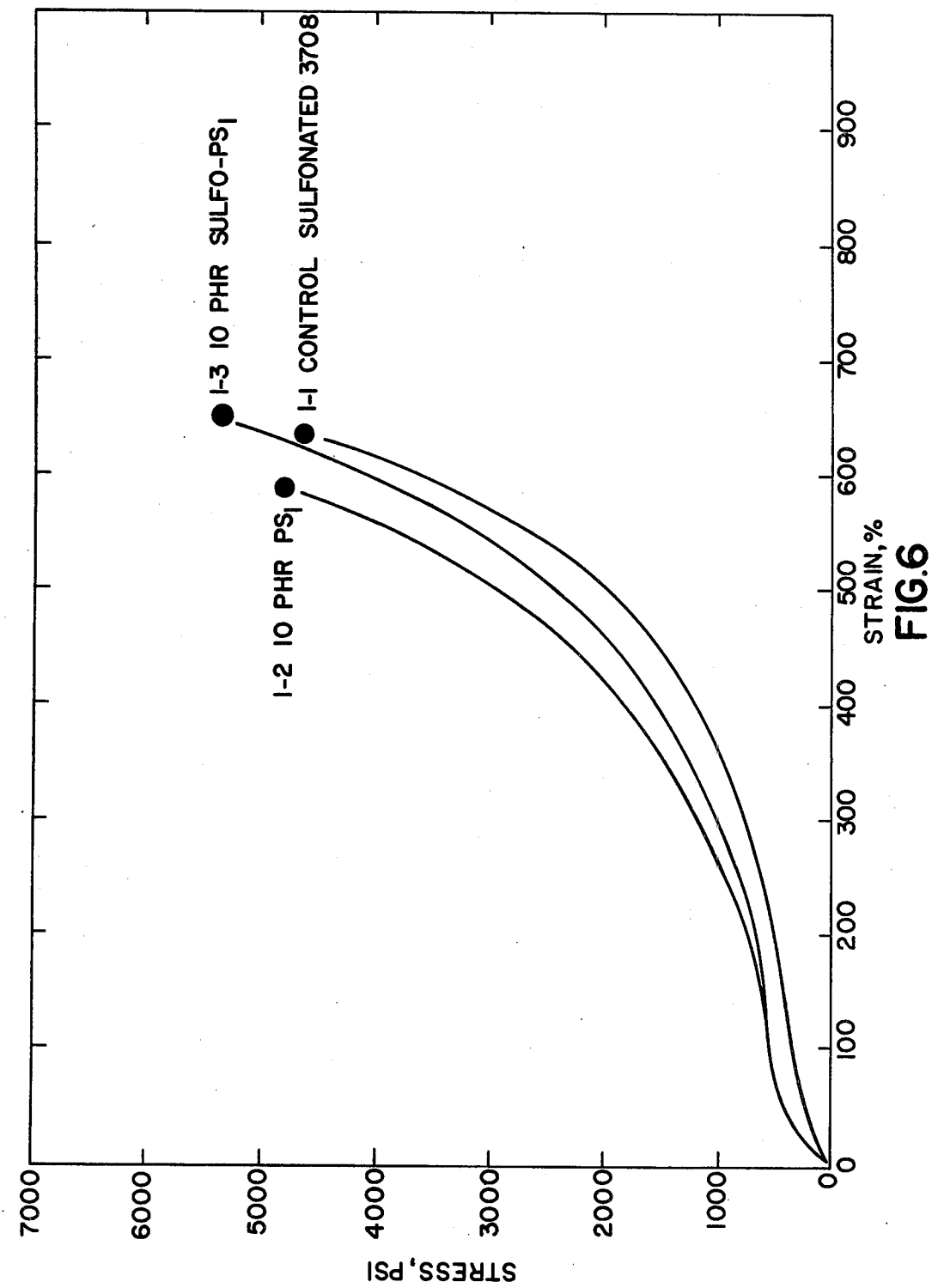
FIG. 6 illustrates a graph of the tensile properties of a sulfo-EPT (EPDM) at room temperature.

FIGS. 4 and 5 show the improvements in the rheological properties of the DOTG neutralized sulfonated EPDM 3708 by the addition of the sulfonated or unsulfonated polystyrene. In both cases, the viscosity is reduced and the flow stability is improved. FIGS. 4 and 5 also show that the rheological properties are uneffected by changes in the $\overline{M}w$ of the sulfonated or unsulfonated polystyrene.

FIGS. 6–11 show the effect on tensile properties of the addition of the sulfonated or unsulfonated polystyrene to the sulfonated EPDM 3708 matrix. The sulfonated polystyrene appears to improve the tensile properties better than does the unsulfonated polystyrene.

Figure 12:
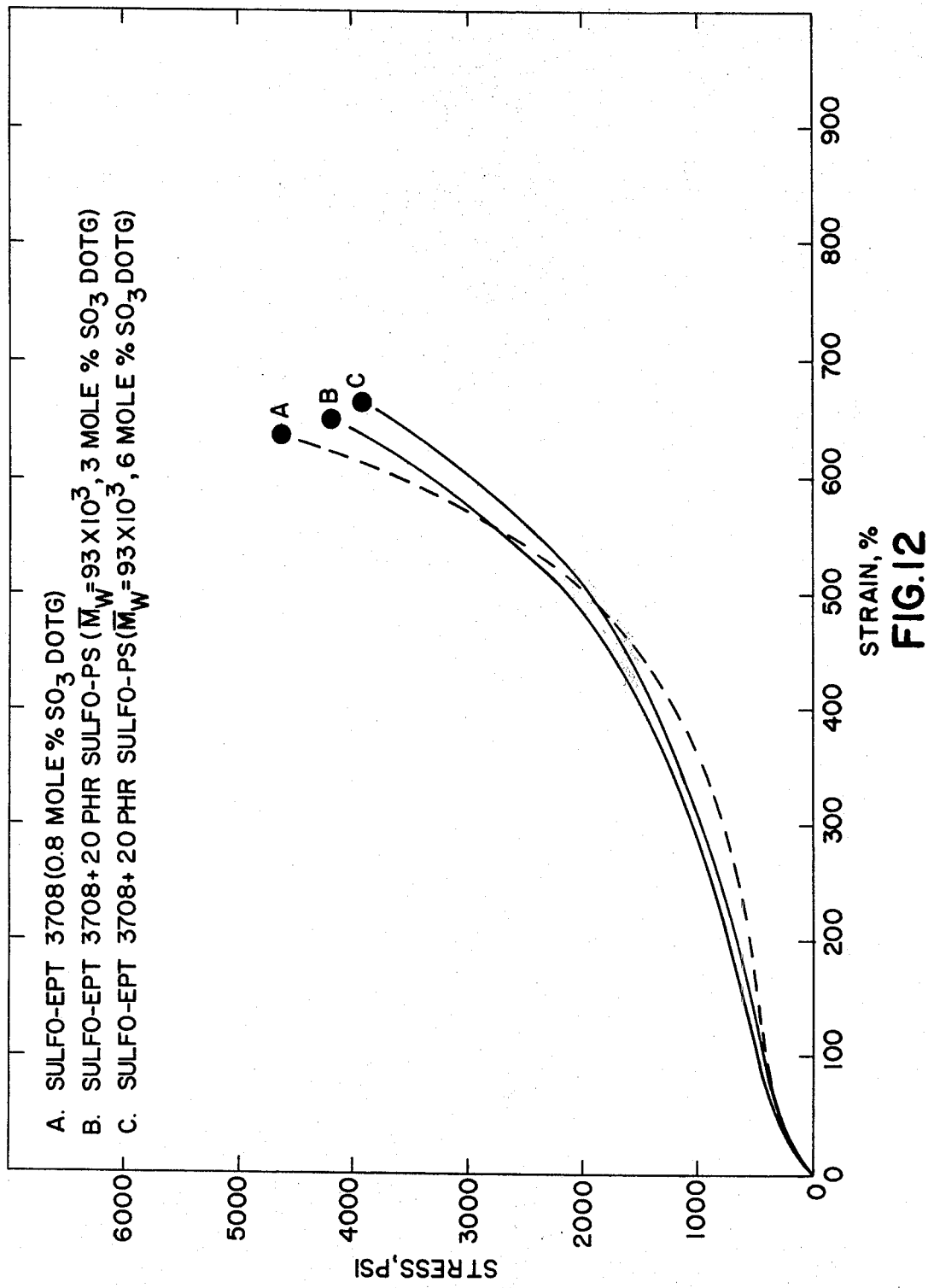
FIG. 12 illustrates a graph of the tensile properties of the sulfo-EPT (EPDM) gum at room temperature as effected by the sulfonation level of a polystyrene.
Figure 13:
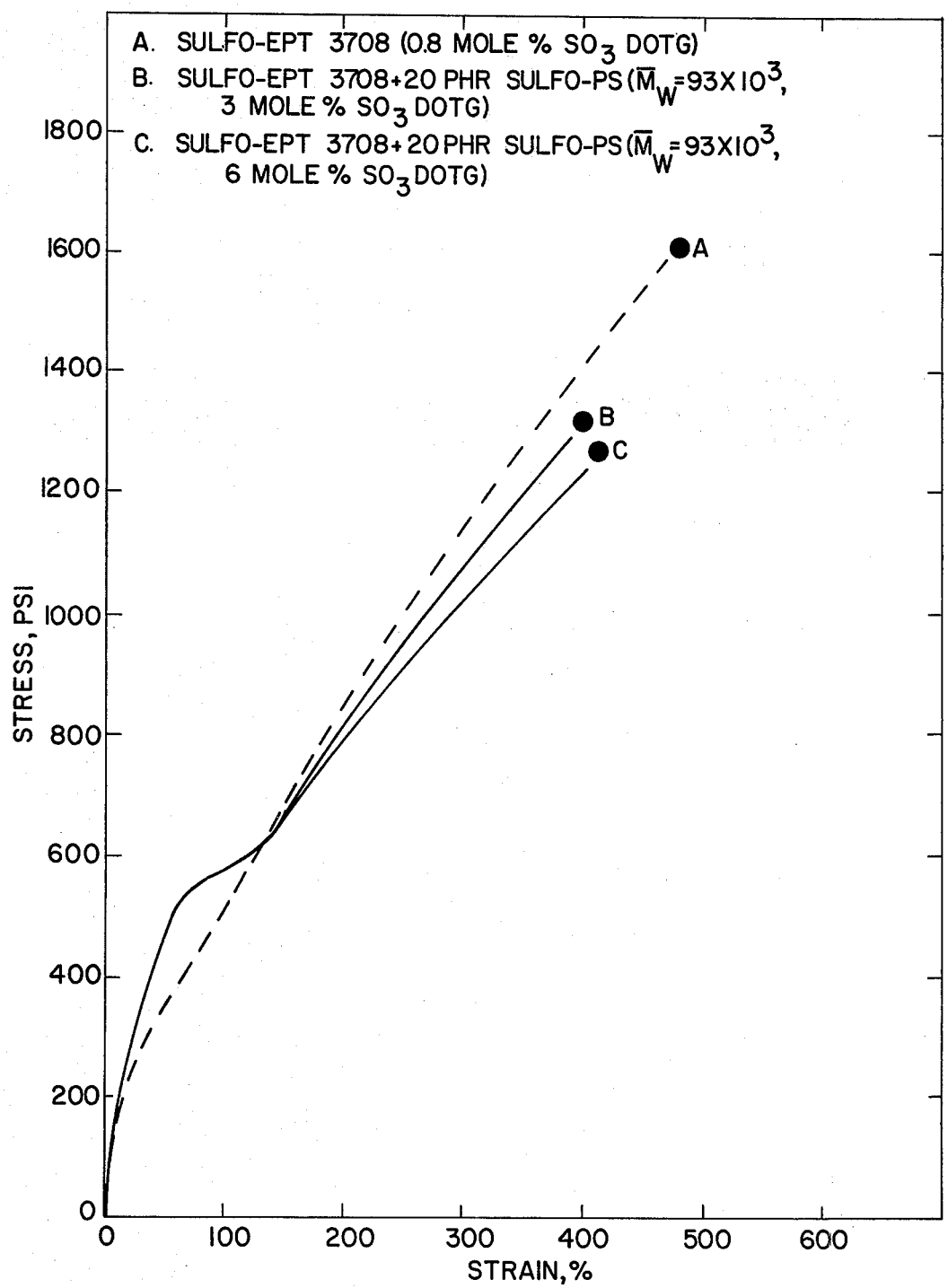
FIG. 13 illustrates a graph of the tensile properties of the sulfo EPT (EPDM) gum at room temperature as effected by the sulfonation level of a polystyrene.

FIGS. 12 and 13 show the effect of the sulfonation level of the polystyrene on the tensile properties of the blended elastomeric composition. Six mole percent sulfonated polystyrene gives somewhat inferior tensile properties as compared to 3 mole percent sulfonated polystyrene at the same loading.

EXAMPLE IV

The compositions of Example III including the sulfonated EPDM 3708 were blended according to the following formula and compounded on a micro-two roll rubber mill to give extended elastomeric blend compositions.

TABLE III

| ELASTOMERIC BLEND COMPOSITIONS | | | | | | | | |
|---|---|---|---|---|---|---|---|---|
| wt. % of sulfonated EPDM terpolymer 0.8 mole % of $SO_3$ . DOTG | Sample # | wt. % of polystyrene | wt. % of sulfonated polystyrene 3.0 mole % of $SO_3$ . DOTG | $\overline{M}w$ polystyrene | Shore A Hardness | Compression Set ASTM-R RT | 40° C. | Other Elastomeric Resin |
| 100 | 1-1 | — | — | — | 73.0 | 43.5 | 76.9 | |
| 90 | 1-2 | 10 | — | $287 \times 10^3$ | 74.0 | 48.8 | 100 | |
| 90 | 1-3 | — | 10 | $287 \times 10^3$ | 73.0 | 39.9 | 100 | |
| 80 | 1-4 | 20 | — | $287 \times 10^3$ | 80.0 | 52.2 | 100 | |
| 80 | 1-5 | — | 20 | $287 \times 10^3$ | 76.0 | 46.2 | 100 | |
| 90 | 1-6 | 10 | — | $93 \times 10^3$ | 76.0 | 43.0 | 77.1 | |
| 90 | 1-7 | — | 10 | $93 \times 10^3$ | 80.0 | 39.3 | 77.7 | |
| — | 1-8 | — | — | — | 65.0 | 39.0 | 84.9 | |
| — | 1-9 | — | — | — | 63.0 | 41.0 | 61.0 | EPDM 3708 Kraton 101 |

Figure 2:
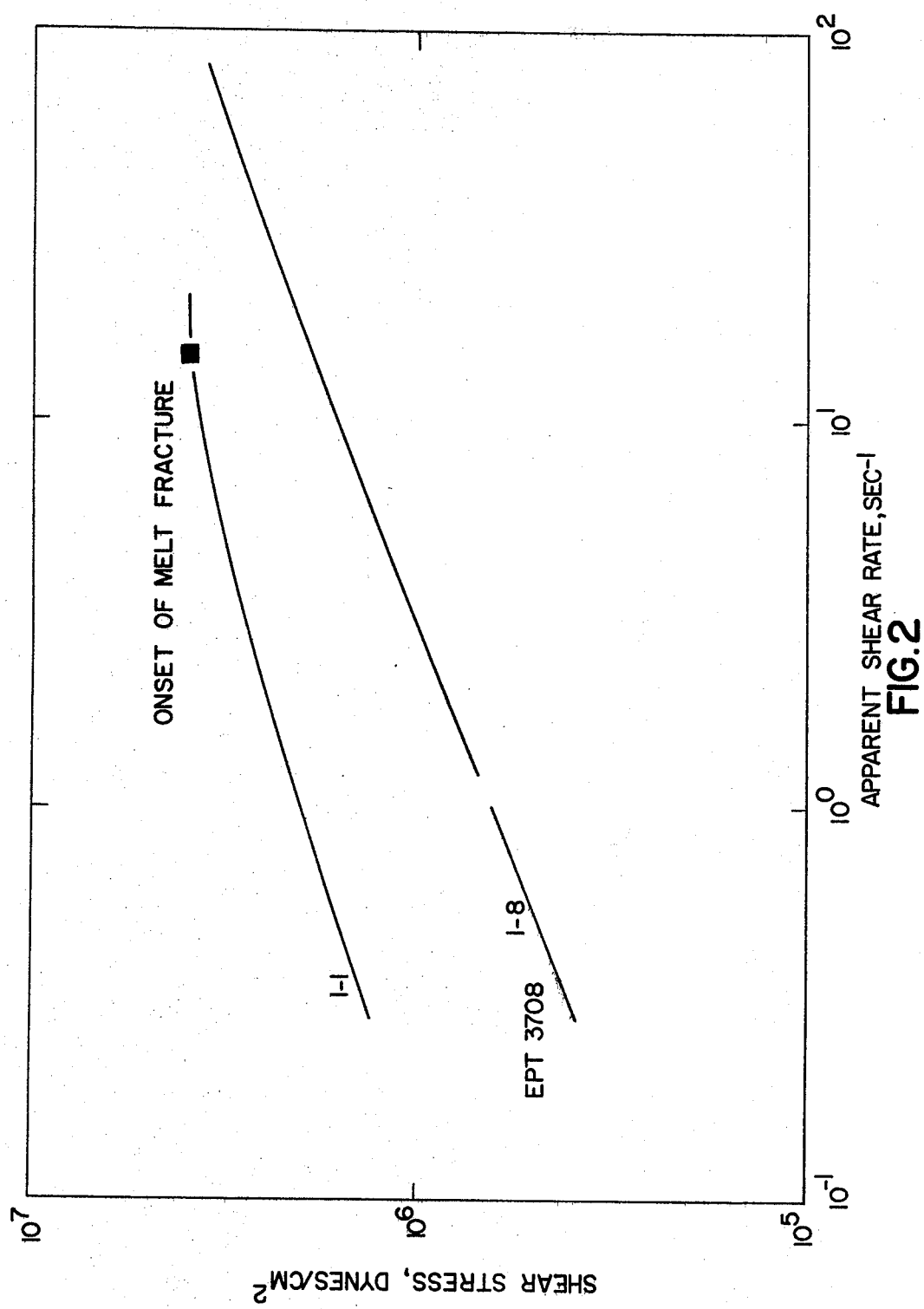
FIG. 2 illustrates a graph of gum tensile properties at 200° C.

Sulfonation of EPDM 3708 improves the tensile properties as shown in FIG. 1 as compared to unsulfonated EPDM 3708; however, sulfonation and neutralization severely deteriorates the rheological properties of EPDM as shown in FIG. 2. The neutralized sulfonated EPDM 3708 has very poor flow stability manifested by melt fracture at a low shear rate of 15 sec$^{-1}$ and about 3 times as high viscosity at 200° C. as that of unsulfonated EPDM 3708. The hardness as seen in Table I of the EPDM terpolymer increases upon sulfo-

| | wt. percent |
|---|---|
| Blend Compositions of Example III | 28.57 |
| Flexon Oil 580 (Exxon Chemical Co.) | 28.57 |

-continued

| | wt. percent |
|---|---|
| HAF Carbon Black (Cabot Corp.) | 42.86 |

Sample pads of 2"×2"×0.040" were molded at 350° F. for five min. and micro-specimens were cut out for physical testing.

Tables III and IV clearly show that the incorporation of the filler and oil generally increases the hardness and compression set for the elastomeric blend compositions of the neutralized sulfonated EPDM 3708 and either the neutralized sulfonated or unsulfonated polystyrene.

Figure 7:
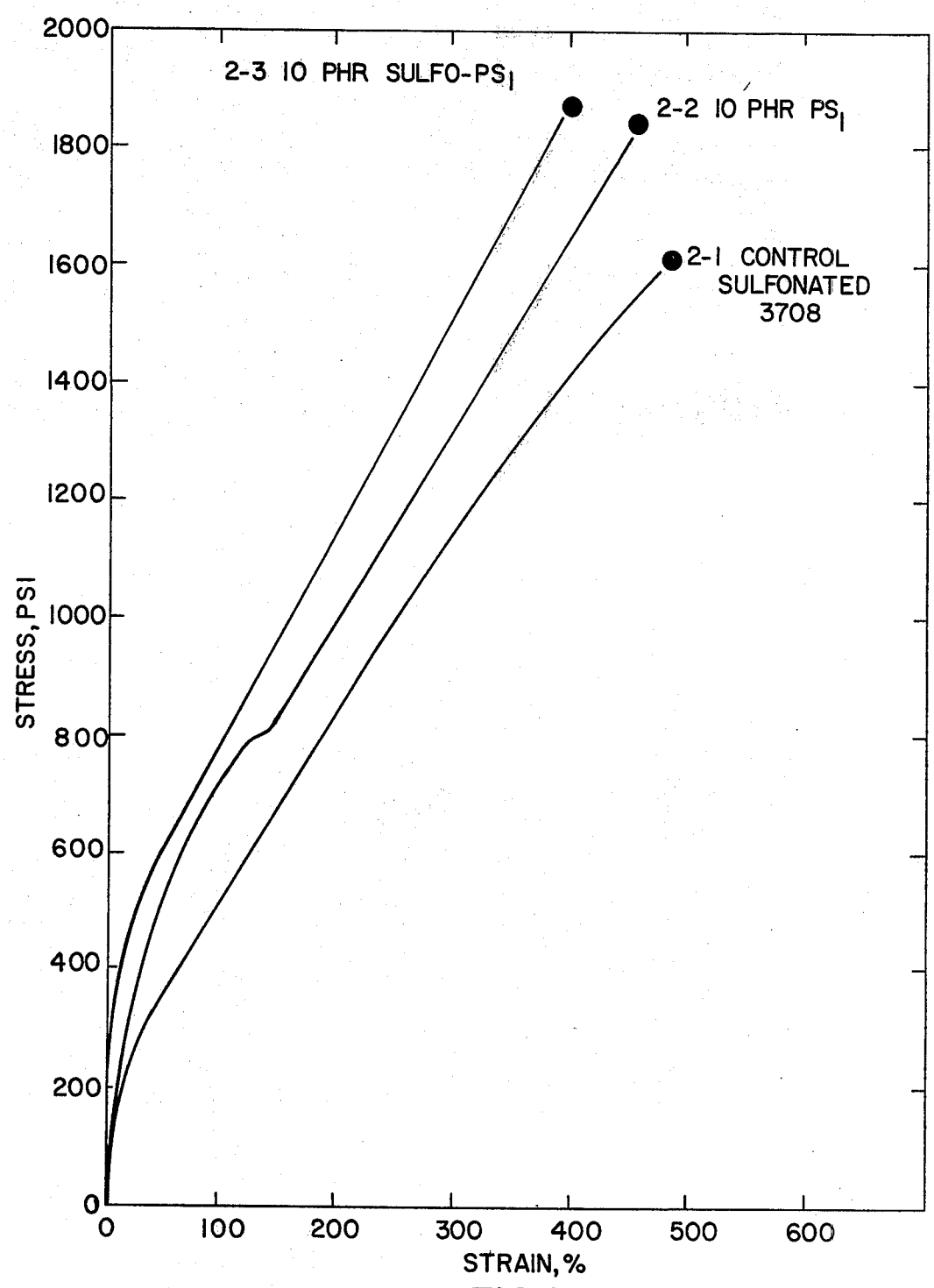
FIG. 7 illustrates a graph of the tensile properties of sulfo-EPT (EPDM) compound at room temperature.
Figure 8:
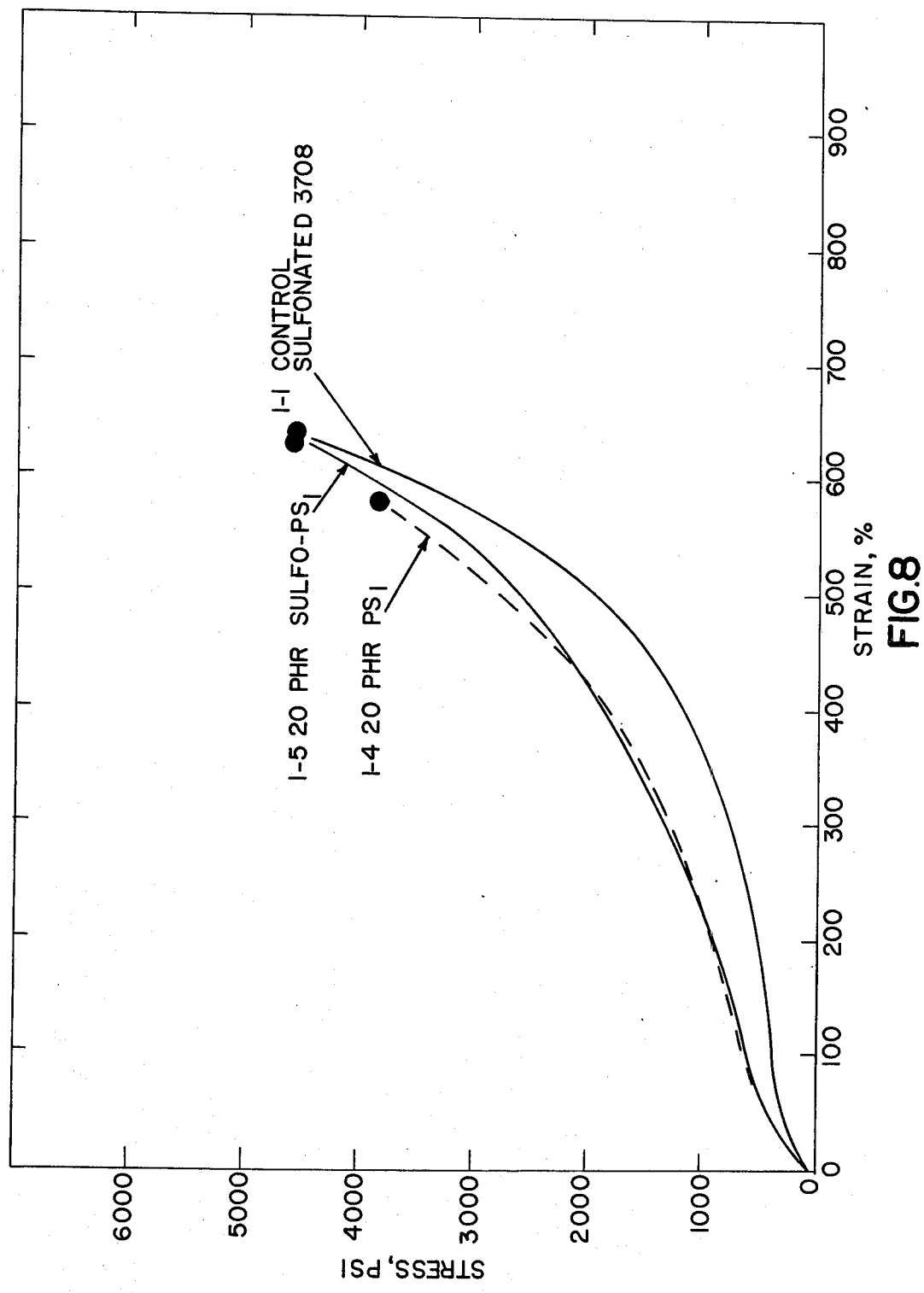
FIG. 8 illustrates a graph of the tensile properties of a sulfo-EPT (EPDM) gum at room temperature.
Figure 9:
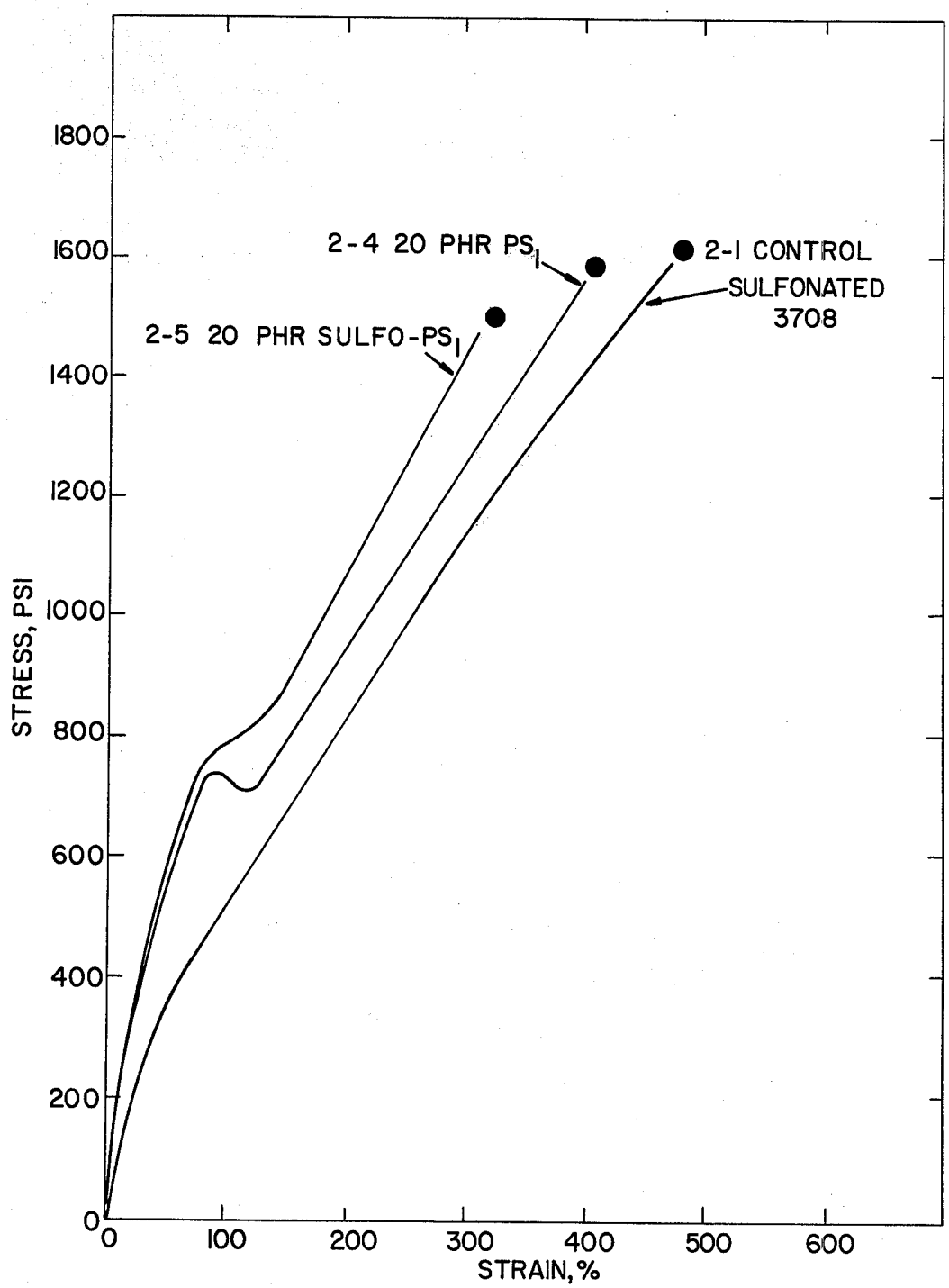
FIG. 9 illustrates a graph of the tensile properties of a sulfo-EPT (EPDM) compound at room temperature.
Figure 10:
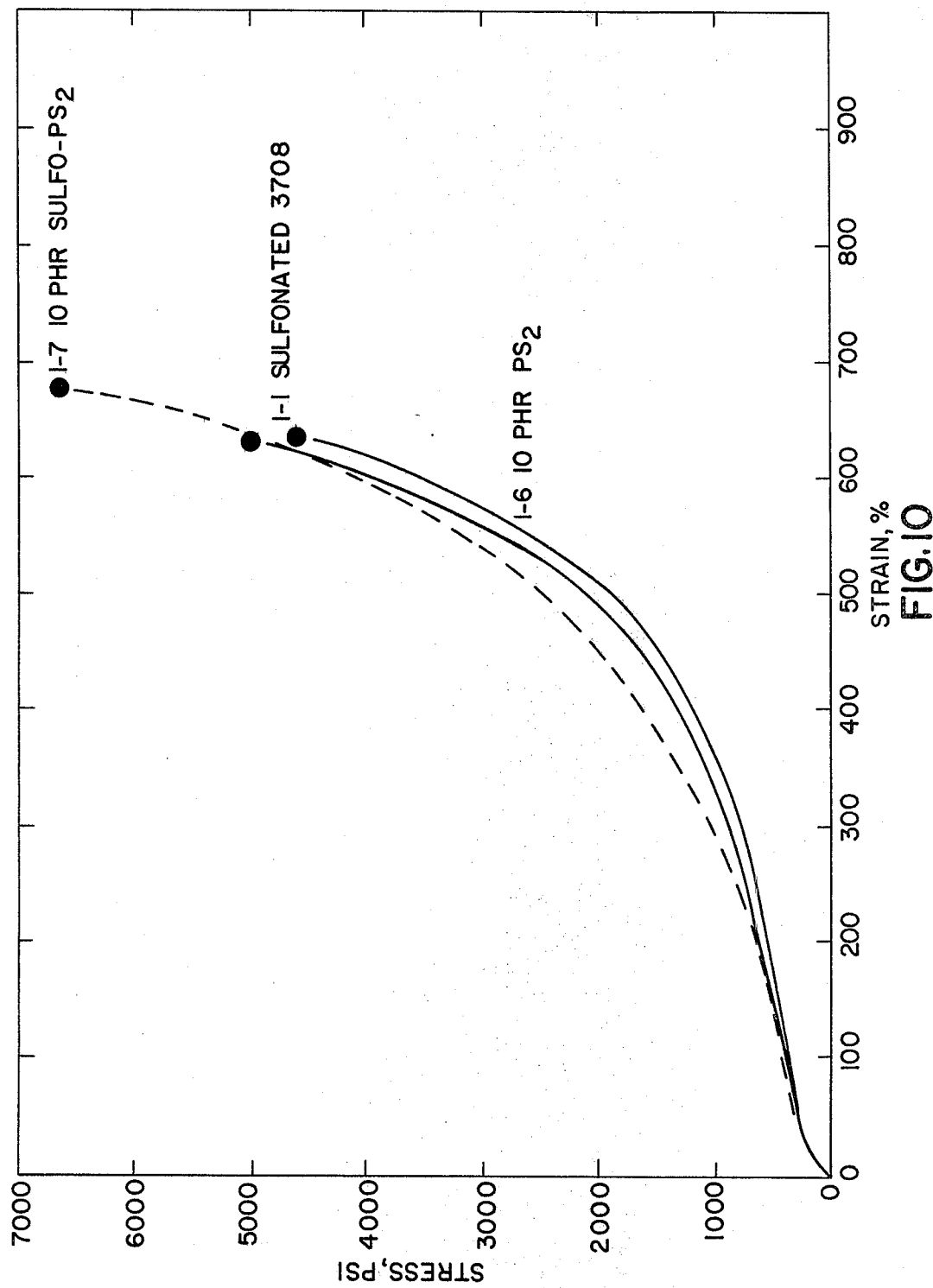
FIG. 10 illustrates a graph of the tensile properties of the sulfo-EPT (EPDM) gum at room temperature.
Figure 11:
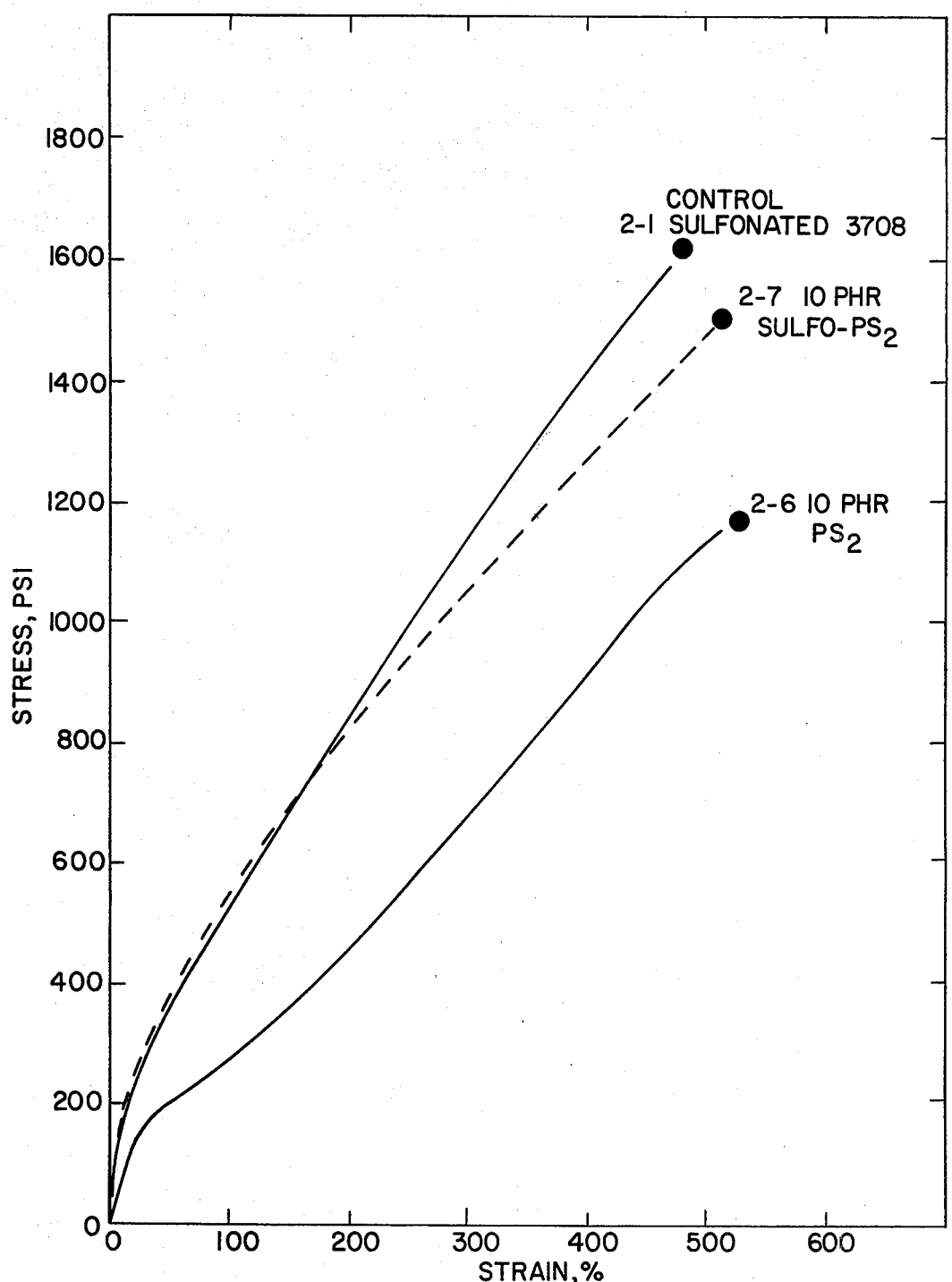
FIG. 11 illustrates a graph of the tensile properties of the sulfo-EPT (EPDM) compound at room temperature.

FIGS. 7, 9 and 10 show the tensile properties for the extended elastomeric blend compositions that the tensile properties are improved by the addition of either neutralized sulfonated or unsulfonated polystyrene, wherein the neutralized sulfonated polystyrene seems to be somewhat more effective.

The elastomeric blend compositions prepared by the improved unique and novel process of this invention can be fabricated by conventional rubber fabricating techniques into a number of useful articles. For example, film, washer hose and radiator hose have been made by an extrusion process.

Since, many modifications of this invention may have been made without departing from the spirit or scope of the invention thereof, it is not intended to limit the scope or spirit to the specific examples thereof.

TABLE IV

ELASTOMERIC BLEND COMPOSITIONS EXTENDED WITH FILLER AND OIL

| wt. % of sulfonated EPDM terpolymer 0.8 mole % of SO$_3$. DOTG | Sample # | wt. % of polystyrene | wt. % of sulfonated polystyrene 3.0 mole % of SO$_3$. DOTG | Mw polystyrene | Shore A Hardness | Compression Set ASTM-R RT | 40° C. |
|---|---|---|---|---|---|---|---|
| 100 | 2-1 | — | — | — | 81 | 100 | 100 |
| 90 | 2-2 | 10 | — | 287 × 10$^3$ | 85 | 100 | 100 |
| 90 | 2-3 | — | 10 | 287 × 10$^3$ | 83 | 80.7 | 100 |
| 80 | 2-4 | 20 | — | 287 × 10$^3$ | 87 | 100 | 100 |
| 80 | 2-5 | — | 20 | 287 × 10$^3$ | 85 | 100 | 100 |
| 90 | 2-6 | 10 | — | 93 × 10$^3$ | 72 | 71.5 | 100 |
| 90 | 2-7 | — | 10 | 93 × 10$^3$ | 81 | 87.1 | 96.3 |

What is claimed is:

1. A process for forming a heterogeneous elastomeric blend composition, which comprises the following steps:
   (a) dissolving a thermoplastic resin selected from the group consisting of polystyrene, poly alpha methylstyrene, poly t-butylstyrene or polyhalo-styrene in a non-reactive solvent to form a first solution;
   (b) dissolving an EPDM terpolymer in said non-reactive solvent to form a second solution;
   (c) sulfonating said EPDM terpolymer in said second solution with a suitable sulfonating agent to form an acid form of a sulfonated EPDM terpolymer, said acid form having about 0.2 to about 10.0 mole percent of sulfonate groups;
   (d) quenching said second solution;
   (e) blending said first solution into said second quenched solution to form a mixture of said thermoplastic resin and said acid form of said sulfonated elastomeric polymer in said blended solutions;
   (f) neutralizing with a basic material said acid form of said sulfonated EPDM terpolymer in said blended solutions; and
   (g) steam stripping said blended solutions to remove the elastomeric blend composition, said blend composition comprising said neutralized sulfonated EPDM terpolymer and about 1 to about 20 parts per hundred by weight of said thermoplastic resin based on 100 parts by weight of neutralized sulfonated EPDM terpolymer.

2. A process according to claim 1, further comprising sulfonation of said thermoplastic resin in said first solution to form an acid form of a sulfonated thermoplastic resin, said acid form having about 0.2 to about 10.0 mole percent sulfonate groups; and neutralizing with said basic material said acid form of said sulfonated thermoplastic resin in conjunction with said acid form of said sulfonated EPDM terpolymer in said blended solutions.

3. A process according to claim 1, wherein said thermoplastic resin is polystyrene.

4. A process according to claim 2, wherein said thermoplastic resin is polystyrene.

5. A process according to claim 1, wherein said non-reactive solution is a chlorinated aliphatic hydrocarbon.

6. A process according to claim 1, wherein said EPDM terpolymer consists essentially of about 40 to about 65 wt. % of ethylene, of about 10 to about 53 wt. % of propylene, and of about 2 to about 10 wt. % of a non-conjugated diene.

7. A process according to claim 6, wherein said non-conjugated diene is selected from the group consisting essentially of 1,4 hexadiene, dicyclopentadiene, alkydine substituted norbornene, methylene norbornene, or tetrahydroindene.

8. A process according to claim 6, wherein said non-conjugated is 5-ethylidene-2-norbornene.

9. A process according to claim 1, wherein said basic material is an organic amine.

10. A process according to claim 9, wherein said organic amine is di-ortho-tolyl guanidine.

11. A process according to claim 2, wherein said basic material is an organic amine.

12. A process according to claim 11, wherein said organic amine is di-ortho-tolyl guanidine.

13. A process according to claim 1, wherein said thermoplastic resin is at a concentration level in said blend composition of about 1 to about 20 parts per hundred by weight based on 100 parts of said neutralized sulfonated EPDM terpolymer.

14. A process according to claim 2, wherein said neutralized sulfonated thermoplastic resin in said blend composition is at a concentrate level of about 1 to about 20 parts per hundred by weight based on 100 parts of said neutralized sulfonated EPDM terpolymer.

15. A process according to claim 1, wherein said blend composition further includes a process oil, said process oil being selected from the group consisting essentially of naphthenics, aromatics, or paraffinics.

16. A process according to claim 15, wherein said blend composition further includes a filler, said filler being selected from the group consisting essentially of carbon blacks, talc, clays or calcium carbonate, and mixtures thereof.

* * * * *